(12) United States Patent
Kötter et al.

(10) Patent No.: US 9,878,618 B2
(45) Date of Patent: Jan. 30, 2018

(54) INFORMATION PLAYBACK SYSTEM AND METHOD FOR INFORMATION PLAYBACK

(71) Applicant: VOLKSWAGEN AKTIENGESELLSCHAFT, Wolfsburg (DE)

(72) Inventors: Nils Kötter, Braunschweig (DE); Holger Wild, Berlin (DE); Heino Wengelnik, Wolfsburg (DE); Frank Althoff, Lehrte (DE)

(73) Assignee: Volkswagen AG, Wolfsburg (DE)

( * ) Notice: Subject to any disclaimer, the term of this patent is extended or adjusted under 35 U.S.C. 154(b) by 1 day.

(21) Appl. No.: 14/442,537

(22) PCT Filed: Nov. 6, 2013

(86) PCT No.: PCT/EP2013/073124
§ 371 (c)(1),
(2) Date: May 13, 2015

(87) PCT Pub. No.: WO2014/075962
PCT Pub. Date: May 22, 2014

(65) Prior Publication Data
US 2016/0288643 A1 Oct. 6, 2016

(30) Foreign Application Priority Data

Nov. 14, 2012 (DE) .......................... 10 2012 022 312

(51) Int. Cl.
*B60K 35/00* (2006.01)
*G06F 3/0488* (2013.01)
(Continued)

(52) U.S. Cl.
CPC ............ *B60K 35/00* (2013.01); *G06F 3/0482* (2013.01); *G06F 3/0488* (2013.01);
(Continued)

(58) Field of Classification Search
CPC ... B60K 35/00; G06F 3/0482; G06F 3/04842; G06F 3/04883; G06F 3/04817
(Continued)

(56) References Cited

U.S. PATENT DOCUMENTS

| 2006/0020903 A1 | 1/2006 | Wang et al. |
| 2006/0161870 A1 | 7/2006 | Hotelling et al. |

(Continued)

FOREIGN PATENT DOCUMENTS

| DE | 102009058145 A1 | 6/2011 |
| EP | 2169523 A1 | 3/2010 |

(Continued)

OTHER PUBLICATIONS

Search Report for German Patent Application No. 10 2012 022 312.9; dated May 12, 2014.
(Continued)

*Primary Examiner* — Fred Tzeng
(74) *Attorney, Agent, or Firm* — Barnes & Thornburg LLP (57) ABSTRACT

An information playback system in a vehicle having a processor designed to generate a video or control signal and provide this signal to a display device so that the video or control signal causes a playback of at least two different contents in two adjoining subsurfaces of a display surface in a display device. The processor generates the video or control signal so that a boundary between the two subsurfaces can be shifted based on a selection detected by the display unit, or based on an approach detected by a display unit, or based on a predefined movement detected by an input device, resulting in modification of the ratio of the surface portions of the two subsurfaces on the display surface of the display device.

18 Claims, 8 Drawing Sheets

(51) Int. Cl.
*G06F 3/0482* (2013.01)
*G06F 3/0484* (2013.01)

(52) U.S. Cl.
CPC ...... *G06F 3/04842* (2013.01); *G06F 3/04883* (2013.01); *G06F 3/04886* (2013.01); *B60K 2350/1016* (2013.01); *B60K 2350/1028* (2013.01); *B60K 2350/1052* (2013.01)

(58) Field of Classification Search
USPC ........................................................ 345/173
See application file for complete search history.

(56) References Cited

U.S. PATENT DOCUMENTS

| | | | |
|---|---|---|---|
| 2007/0160345 A1* | 7/2007 | Sakai | G06F 3/04817 386/230 |
| 2007/0222769 A1 | 9/2007 | Otsuka et al. | |
| 2009/0043446 A1* | 2/2009 | Drew | G01C 21/00 340/438 |
| 2009/0128498 A1 | 5/2009 | Hollemans et al. | |
| 2009/0184812 A1* | 7/2009 | Drew | B60K 35/00 340/438 |
| 2009/0315848 A1 | 12/2009 | Ku et al. | |
| 2010/0088634 A1 | 4/2010 | Tsuruta et al. | |
| 2010/0300771 A1 | 12/2010 | Miyazaki | |
| 2011/0074829 A1 | 3/2011 | Lee | |
| 2011/0128164 A1 | 6/2011 | Kang et al. | |
| 2011/0196578 A1 | 8/2011 | Strohmaier et al. | |
| 2011/0246877 A1 | 10/2011 | Kwak et al. | |
| 2011/0310048 A1 | 12/2011 | B.R. et al. | |
| 2011/0320969 A1 | 12/2011 | Hwang et al. | |
| 2012/0176322 A1 | 7/2012 | Karmi et al. | |
| 2014/0107821 A1* | 4/2014 | Kusaka | B60K 35/00 700/94 |
| 2014/0300494 A1* | 10/2014 | Tseng | B60K 35/00 340/932.2 |
| 2015/0254041 A1* | 9/2015 | Hoshihara | B60K 35/00 345/173 |

FOREIGN PATENT DOCUMENTS

| | | |
|---|---|---|
| EP | 2330383 A1 | 6/2011 |
| WO | PCT/GB2011/051468 | 8/2011 |
| WO | 2012094656 A1 | 7/2012 |

OTHER PUBLICATIONS

Search Report for International Patent Application No. PCT/EP2013/073124; dated Feb. 20, 2014.

* cited by examiner

INFORMATION PLAYBACK SYSTEM AND METHOD FOR INFORMATION PLAYBACK

PRIORITY CLAIM

This patent application is a U.S. National Phase of International Patent Application No. PCT/EP2013/073124, filed 6 Nov. 2013, which claims priority to German Patent Application No. 10 2012 022 312.9, filed 14 Nov. 2012, the disclosures of which are incorporated herein by reference in their entirety.

SUMMARY

Illustrative embodiments relate to an information playback system, a method for information playback, and a program with a program code to carry out a method for information playback.

BACKGROUND

Modern vehicles today already contain a large number of devices which serve to play back different types of information. The information to be played back ranges from vehicle condition parameters, such as e.g. speed, engine speed, fuel tank level or odometer, navigation and communication information through to entertainment media, such as e.g. films, radio or games. The number of available information types is constantly increasing. The number and variety of display systems is also increasing accordingly. Today, for example, LED (Light Emitting Diode) displays, TFT (Thin Film Transistor) screens or touch-sensitive screens, referred to as touchscreens, can be found along with analog display instruments.

The operation of the playback systems is intended to be designed to be as simple and intuitive as possible, so that the user of the vehicle is distracted as little as possible from controlling the vehicle when controlling the playback system. The less the driver is distracted from his main activity, i.e., controlling the vehicle, the higher the safety of use of the information playback system.

The need, therefore, exists to produce an information playback system which enables a simple and intuitive operation to increase the safety of use of the information playback system.

BRIEF DESCRIPTION OF THE DRAWINGS

Disclosed embodiments are explained in detail below with reference to the attached figures. In the figures.

DETAILED DESCRIPTION OF THE DISCLOSED EMBODIMENTS

Disclosed embodiments relate to an information playback system in a vehicle with a processor which is designed to generate a video or control signal and deliver it to a display device, so that a playback of at least two different content elements in two adjacent sub-areas of a display area of the display device is initiated by the video or control signal. Furthermore, the processor is designed to generate the video or control signal so that a boundary between the two sub-areas is movable, based on a selection, detected by the display unit and caused by a touch of a user, of a display division touch button in one of the two sub-areas, based on an approach of a user, detected by an input device, to one of the two sub-areas, or based on a predefined movement of a user, detected by an input device, in a directional orthogonal to the boundary between the two sub-areas, so that a ratio of the area proportions of the two sub-areas on the display area of the display device changes.

Due to the movability of the boundary between sub-areas of the display device, the user can very flexibly choose which content elements are to be displayed in which sub-areas of the display device and how much of the display area is to be used for this purpose. Since this involves a very frequently used function during a journey (e.g. changing the radio channel, operating the navigation device, controlling the air conditioning system or using a telephone), a simple and intuitive operability is desirable. This simple and intuitive operability can be guaranteed by the movability of the boundary between sub-areas through the touching of display division touch buttons on the display area of the display device, due to the approach to one of the two sub-areas or due to the detection of a predefined movement of the user orthogonal to the boundary. The safety of use of the information playback system can be significantly increased through this simple and intuitive operability.

In some disclosed embodiments, the display device is a touch-sensitive screen and the boundary between the two sub-areas can be moved on the basis of a selection, detected by the touch-sensitive screen and caused by a touch of a user, of the display division button in one of the two sub-areas. The display device therefore serves simultaneously as an input device. As a result, the user can change the area division through simple and intuitive touching of a corresponding button on the touch-sensitive screen.

In some disclosed embodiments, an input device is a spatial-resolution proximity sensor which is designed to detect an approach of a user and identify which of the two sub-areas the user is approaching. As a result, the user can already influence the area division by approaching, i.e., even before touching the display device. In this way, it suffices for the user to approach the display very roughly only, i.e., with little precision, to achieve the desired change in the area division, which, particularly in the case of a journey on uneven terrain or at high speeds, significantly simplifies the operation and thus increases safety of use.

Some disclosed embodiments relate to an information playback system in which an input device is a touch-sensitive screen which is designed to detect the predefined movement on its surface, or in which an input device is a camera system which is designed to detect the predefined movement through an evaluation of a gesture of the user. The processor can generate the video or control signal in such a way that the boundary is moved in the direction of the movement. As a result, the boundary can be moved in a very simple and intuitive manner in the direction of the movement of the user, e.g. through a swiping movement. This can be implemented via the camera system by means of a gesture control or by means of a movement on the surface of the touch-sensitive screen.

In some disclosed embodiments, the processor is designed to generate the video or control signal in such a way that the boundary can be moved at predefined places only. The boundary cannot therefore be moved continuously and to any places, but can be moved in discrete steps to predefined places only. As a result, on the one hand, in the case of a journey through uneven terrain or at high speed, it can be enabled that the user moves the boundary through unwanted movements to an unwanted place (e.g. makes a sub-area very small) or inadvertently hides a sub-area completely. Similarly, in the case of an operation of the information playback system by the touching of a display division touch button, it can be achieved that the boundary moves, for example, to the next predefined place on actuation of the touch button.

Some disclosed embodiments relate to a permanently installed infotainment system of a vehicle with an information playback system according to the previously described concept. The permanently installed infotainment system can easily be taken into account in the design of the vehicle and can ideally be integrated into the vehicle so that the user has access to the necessary information as simply and conveniently as possible via one or more display devices and can operate the information playback system as simply and intuitively as possible.

In the description below of the attached figures which show disclosed embodiments, the same reference numbers denote identical or comparable components. Furthermore, combining reference numbers are used for components and objects which occur multiple times in at least one disclosed embodiment or in the drawing, but are described jointly in terms of one or more features. Components or objects which are described with the same or combining reference numbers may be designed identically, but, where relevant, may also be designed differently, in terms of individual, some, or all features, for example their dimensions, unless otherwise indicated, explicitly or implicitly, in the description.

Figure 1:
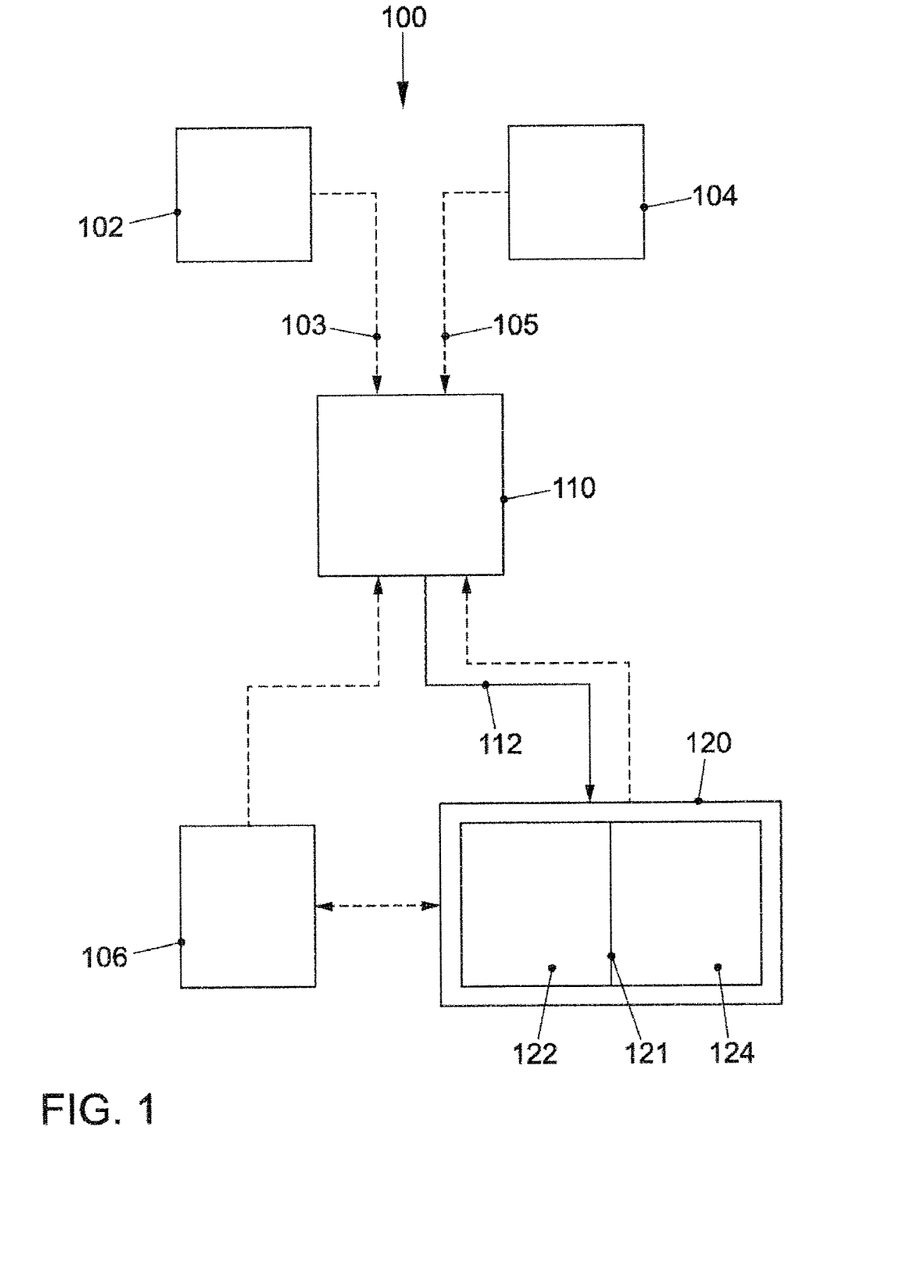
FIG. 1 shows a block diagram of an information playback system.

FIG. 1 shows a block diagram of an information playback system 100 in a vehicle according to at least one disclosed embodiment. The information playback system 100 comprises a processor 110 which generates a video or control signal 112 and delivers it to a display device 120, so that a playback of at least two different content elements 103, 105 is initiated by the video or control signal 112 in two adjacent sub-areas 122, 124 of a display area of the display device 120. Furthermore, the processor 110 generates the video or control signal 112 so that a boundary 121 between the two sub-areas 122, 124 is movable. The boundary 121 is movable on the basis of a selection or actuation of the display division touch button in one of the two sub-areas 122, 124 detected by the display device 120 and caused by a touch of a user, based on an approach of a user, detected by an input device 106, to one of the two sub-areas 122, 124, or based on a predefined movement of a user, detected by an input device 106, in a direction orthogonal to the boundary 121 between the two sub-areas 122, 124. This results in a change in a ratio of the area portions of the two sub-areas 122, 124 in relation to one another on the display area of the display device 120.

Due to the movability of the boundary through the touching of a corresponding touch button on the display device, due to the approach of the user to the display device or due to the detection of a predefined movement orthogonal to the boundary, the boundary between the two sub-areas can be moved in a simple and intuitive manner. Due to this simple operating concept, the safety of use of the information playback system by the driver of a vehicle can be significantly increased. In other words, to change the area division of the display device, the user can therefore simply press a touch button, can move the boundary even by approaching a sub-area or can move the boundary by means of a predefined movement. The user can individually design the division of the display area of the display device 120 and change it as required.

The boundary 121 can be moved either on the basis of a touch of a corresponding touch button on the display device or by the user approaching the display device or by the detection of a predefined movement. Alternatively, the boundary 121 is also movable on the basis of a plurality or any given combination of these options, or on the basis of all these options.

The content elements 103, 105 to be played back, and also their sources 102, 104, may be of various types. For example, content 103, 105 to be played back may consist of entertainment information (e.g. film, radio or games), vehicle condition information (e.g. speed, engine temperature, engine speed or mileage), communication information (e.g. telephone directory) or navigation data. A content or information element may be defined in any manner. A content element may, for example, be an individual bit or a plurality of bits of the video or control signal, a value to be presented (e.g. speed), an entire image (e.g. an image of a navigation map or a compilation of content elements to be played back which are presented jointly on an image) or an image segment or similar. Correspondingly, an information source 102, 104 may, for example, be a DVD player, a radio set, a computer, a laptop, a vehicle sensor or a navigation device. The information may be made available in a data format that is conventional for the respective information source.

The at least two different content elements 103, 105 may be played back originate from the same information source 102, 104 (e.g. list of all performers in a music database as the first content element and the currently played back song as the second content element, which both originate from the same playback device as the information source) or from two different information sources 102, 104 (e.g. a first content element from a navigation device and a second content element from a radio set) as shown, for example, in FIG. 1.

The at least one information source 102, 104, the input device 106 and the display device 120 may be connected as an external unit to the information playback system 100 (e.g. individually or via a communication bus), as indicated by the broken lines in the example from FIG. 1. Alternatively, one or more of these units may also form part of the information playback system 100.

The processor 110 can receive control signals to move the boundary 121 between the sub-areas 122, 124, for example from an input device 106 or from the display device 120 as the input device itself, as indicated by the broken lines in FIG. 1.

The input device 106 can also form part of the display device 120 and can deliver a control signal to the processor 110, as indicated by the broken line between the input device 106 and the display device 120 and the display device 120 and the processor 110.

The display device 120 may, for example, be an LED (Light Emitting Diode) display, a TFT (Thin Film Transistor) screen, a touch-sensitive screen, referred to as a touch-screen, or head-up display.

The information playback system 100, also referred to as the device for playback of information, may form a dedicated unit in the vehicle or may be part of the infotainment system (information and entertainment system) of the vehicle. The user of the information playback system 100 may be the driver of the vehicle or a different occupant of the vehicle.

Depending on the display device 120 that is used, the processor 110 may provide a corresponding video or control signal 112 which causes the display device 120 to display the at least two adjacent sub-areas 122, 124 with the at least two different content elements 103, 105 for the user. The display area of the display device 120 can generally be divided into any number of sub-areas, of which at least two adjacent sub-areas 122, 124 have a movable boundary 121. Since the content elements are intended to be made available to the user in a vehicle in a sufficient size so that the driver can also view the content elements comfortably in his normal sitting position, i.e., at a reasonable distance, the subdivision of the display area may be limited, for example, to 2, 3 or 4 sub-areas. In the example shown in the figures, the display area is merely divided into two sub-areas 122, 124, but, as just mentioned, more sub-areas with different content elements may be displayed by the display device.

The display area of the display device 120 may have any shape, but in most cases is rectangular or square.

The boundary 121 may have any given geometry (e.g. straight, undulating, circular) and may divide the sub-areas 122, 124 from one another in any given direction. However, the boundary 121 will normally be a straight line, even if the boundary can have other shapes. Furthermore, the boundary may be aligned, for example, essentially parallel to one edge of the display area, i.e., particularly in the case of a straight arrangement of the display device in the vehicle (at least one edge of the display area is aligned horizontally) in a horizontal or vertical direction.

The processor 110 can generate the video or control signal 112 in such a way that the boundary 121 between the two sub-areas 122, 124 is displayed visibly for the user on the display area of the display device 120. Alternatively, it may also be clear for the user already, due to the different content elements 103, 105 in the adjacent sub-areas 122, 124, where the boundary between the sub-areas 122, 124 runs, even if the boundary 121 is not displayed directly (e.g. as a line or other graphical element) in the display area of the display device 120. Due to the simple and intuitive operating system, it is also not necessary for the user to know exactly where the boundary between the sub-areas 122, 124 runs, as long as the user can roughly perceive the division of the display area on the basis of the content elements. In the case of the control through the actuation of the display division touch button in one of the two sub-areas 122, 124 by a touching of the display area of the display device 120 by the user, it is in any case clear for the user at what place he must touch the display device 120 to change the ratios of the area portions of the two sub-areas 122, 124 and thus also move the boundary 121. In the case of the control by an approach to one of the two sub-areas, it is similarly not necessary for the user to know exactly where the boundary 121 between the two sub-areas 122, 124 runs, since it is, for example, sufficient to approach a content element which is to be played back and is in any case allocated to one of the two sub-areas 122, 124. Similarly, in the case of a control via a predefined movement orthogonal to the boundary 121, it is not necessary to know exactly where the boundary between the sub-areas 122, 124 runs. This again reflects the simple and intuitive operability.

For example, the boundary 121 between the two sub-areas 122, 124 may essentially run vertically between the two sub-areas 122, 124 from an upper edge of the display area of the display device 120 to a lower edge of the display area of the display device 120.

The boundary 121 can generally be moved continuously or in discrete steps only. For example, the process 100 can generate the video or control signal 112 in such a way that the boundary 121 can be moved in predefined steps (at discretely distributed places) only. As a result, for example, the user can be prevented from reducing one of the sub-areas to a size that is no longer usable through an imprecise movement or moves the boundary 121 in an uncontrolled manner due to a bumpy journey. For example, the boundary 121 can always be disposed in the middle of the display area only, in one third or two thirds of the display area or in one, two or three quarters of the display area.

A ratio of the area portions of the two sub-areas 122, 124 on the display area is changed due to the moving of the boundary 121. This change can be at least temporarily constant, since the user normally changes the sizes of the sub-areas so that he is then provided with the required content elements in the sub-areas with the set area sizes and the size ratio is not intended to change again immediately. In other words, after the boundary 121 has been moved by the touching of a corresponding touch button on the display device, by the approach of the user to the display device or by the detection of a predefined movement orthogonal to the boundary 121, the boundary 121 may initially remain at this new position. The boundary 121 may, for example, remain at its position until the user undertakes a movement of the boundary by touching a corresponding touch button on the display device, by the approach of the user to the display device or by the detection of a predefined movement orthogonal to the boundary 121, or until an exception occurs (e.g. a higher-priority content element to be played back, for example a warning message, is shown).

The boundary 121 between the sub-areas 122, 124 can be moved on the basis of a selection of display division touch button in one of the two sub-areas 122, 124. To do this, the display device 120 may, for example, be a touch-sensitive screen and the boundary 121 between the two sub-areas 122, 124 can be moved on the basis of an actuation, detected by the touch-sensitive screen and caused by a touch of a user, of the display division touch button in one of the two sub-areas 122, 124. In other words, due to an actuation of a touch button in one of the two sub-areas 122, 124, the user can simply and intuitively change the area portions of the two sub-areas 122, 124 in relation to one another by means of a movement that is easily possible even during the journey.

The display division touch button may be a defined area of the touch-sensitive screen which, when touched, causes a signal to be transmitted to the processor 110, so that the latter moves the boundary 121 accordingly. The display division touch button may have any given form and any given appearance, as long as the user can recognize which function is achieved through the actuation of this touch button. For example, the display division touch button may have an arrow-like shape or an arrow-like graphic which indicates the direction in which the boundary 121 moves when the display division touch button is touched. As a result, the user can, for example, easily see what he can expect from the actuation of the button. Furthermore, the display division touch button may, for example, be disposed in the sub-area 122, 124 of the two sub-areas 122, 124 which is reduced through actuation of the display division touch button. Furthermore, for example, a display division touch button may also be disposed in each case in both sub-areas 122, 124, resulting, on actuation, in the reduction of the respective sub-area 122, 124 in relation to the other sub-area 122, 124.

Alternatively or additionally, an input device 106 may be a spatial-resolution proximity sensor which detects an approach of a user (e.g. the hand or a finger of the user) and identifies which of the two sub-areas 122, 124 the user is approaching. In other words, if the user moves his hand or finger closer than a defined distance from one of the two sub-areas, the proximity sensor can detect this and inform the processor 110, so that the latter can move the boundary accordingly. As a result, the user is enabled to change the sizes of the sub-areas 122, 124 already by approaching the display device 120, so that the user, in particular during the journey, does not have to move precisely to a specific place on the display device 120 or to a different operating element.

The spatial-resolution proximity sensor may be a dedicated unit or may be integrated into the display device 120. A relatively rough spatial resolution (e.g. accurate to 1 cm, 2 cm, 5 cm) may be sufficient so that the sensor can identify which of the two sub-areas the user is approaching.

For example, the processor 110 may be designed to generate the video or control signal 112 in the event of a detected approach to a first, smaller sub-area of the two sub-areas 122, 124, so that the first sub-area is as large as or larger than the second of the two sub-areas 122, 124 after the boundary 121 has been moved. As a result, the user can, for example, very quickly have the content of the smaller sub-area displayed larger or more information displayed relating to the content of the smaller sub-area.

Alternatively or additionally, the display device 120 may be a touch-sensitive screen and the processor 110, in the event of a detected approach to a first, larger sub-area of the two sub-areas 122, 124, can generate the video or control signal 112 in such a way that, following detection of an approach, at least one actuatable touch button disposed in the first sub-area is shown, compared with previously, as larger or is highlighted. In other words, when the sub-area which is in any event larger is approached, it can be expected that the user wishes to define a setting on the sub-area so that the operation is significantly simplified for the user if possible actuation options are enlarged or highlighted for him, such as one or more actuatable touch buttons. As a result, the operation of the information playback system 100 can be further simplified for the user and safety of use can therefore also be further increased.

Furthermore, additionally or alternatively, the display device 120 may in turn be a touch-sensitive screen and the processor 110, in the event of a detected approach to a first, larger sub-area of the two sub-areas 122, 124, can generate the video or control signal 112 in such a way that, following a detected approach in the first sub-area, a hold button appears as an actuatable touch button, wherein, through actuation of the hold button by the user, the ratio of the area portions of the sub-areas 122, 124 is initially kept constant. In other words, when the user approaches the larger of the two sub-areas, the user can be enabled via a displayed hold button, such as an actuatable touch button, to keep the boundary 121 between the sub-areas 122, 124 constant or freeze it at its position. As a result, the user can be enabled, if he so wishes, to prevent a further moving of the boundary 121. The ratio of the area portions of the sub-areas 122, 124 or the position of the boundary 121 can be kept constant until, for example, the user actuates the hold button once more or an exception occurs (e.g. a higher-priority content that is to be played back, for example a warning message, is shown).

Alternatively or additionally, in the event of a detected approach to one of the two sub-areas 122, 124, the processor 110 can generate the video or control signal 112 in such a way that, following detection of an approach in the one sub-area, a menu appears for selection of a content element to be played back in the one sub-area. In other words, in the event of an approach to a specific part of the display area, the user often wishes to select what is to be displayed in this sub-area. Through the display of a selection menu already during an approach, the user can very simply and quickly be given this facility.

Generally speaking, the display device can additionally switch, for example, to a full-screen mode if the user selects the same content for both sub-areas, so that more information can be provided for this content.

Alternatively or additionally, the information playback system 100 can be controlled by a detected, predefined movement. To do this, an input device 106 may, for example, be a touch-sensitive screen which can detect the predefined movement on its surface, or the input device 106 may be a camera system which the predefined movement through an evaluation of a gesture of the user (i.e., for example, a movement in the space, for example of the arm, the hand or a finger of the user) to be. Furthermore, the processor 110 can generate the video or control signal 112 in such a way that the boundary 121 is moved in the direction of the movement. As a result, the user can be offered a very intuitive facility for moving the boundary 121 between the sub-areas 122, 124. In other words, the user can, for example by means of a touch of the screen, a movement over the screen in a horizontal direction or by means of a horizontal movement in the space, move a vertical boundary 121 between the two sub-areas 122, 124 in the direction of the movement. For example, a movement on the surface of the screen from left to right can similarly move the boundary 121 from left to right or vice versa.

A movement can already be detected or recognized as orthogonal to the boundary 121 if the orthogonal movement component is greater than the parallel movement component. The greater the orthogonal movement component is, the more simply, however, the recognition of the movement as the predefined movement can be carried out.

In addition, the input device 106 can optionally also be designed to detect a predefined movement of the user in a direction parallel to the boundary 121 between the two sub-areas 122, 124. The processor 110 can use this information to generate the video or control signal 112, following detection of a movement running parallel to the boundary 121, in such a way that a content element selected on the basis of the detected movement and differing from the content played back before the detection of the movement is played back in one of the two sub-areas 122, 124. For example, the user can move a vertical boundary 121 by means of a horizontal movement and can select the content of a sub-area on the basis of a vertical movement (e.g. scrolling in a menu by means of the vertical movement).

In combination with a proximity sensor, a selection menu can already be shown, for example, in a sub-area, and a content element to be played back for the sub-area can be selected by means of a movement carried out parallel to the boundary 121.

FIG. 2a to 2i show a schematic representation of an example of the operation of an information playback system with a proximity sensor and a touch-sensitive screen as an input device.

Figure 2A:
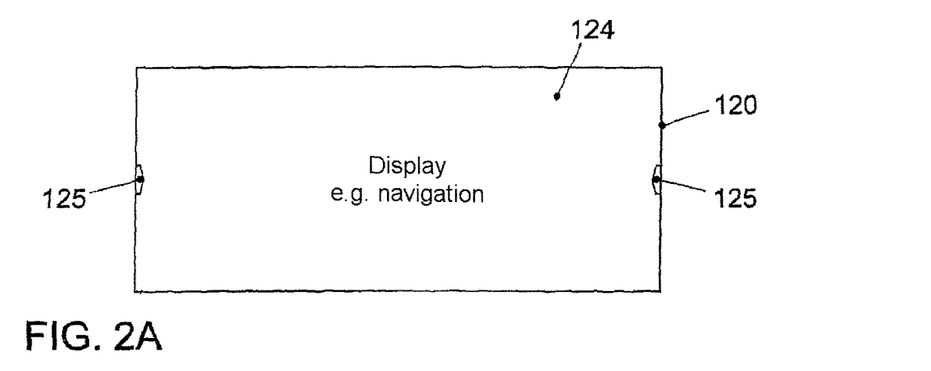
FIGS. 2a to 2i show a schematic representation of the operation of an information playback system with a proximity sensor and a touch-sensitive screen.

FIG. 2a shows the associated display area of a display device 120 in which a content element to be played back is played back in full-screen mode. The user has not yet approached the display device. The display may, for example, play back a content element for navigation. Display division touch buttons 125 are shown on two opposite edges (left and right) of the display area in a reduced representation.

Figure 2B:
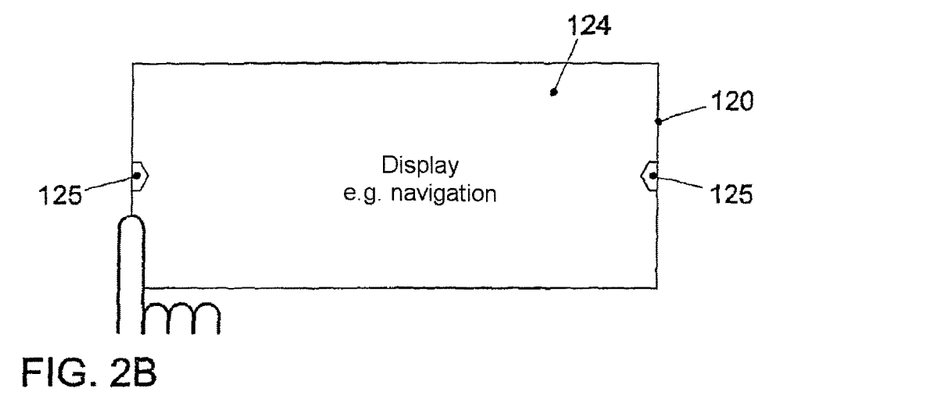

In the event of an approach of a hand or a finger of a user, which can be identified by the proximity sensor, the reduced display of the display division touch buttons 125 switches to an enlarged representation of the display division touch buttons 125, so that the user can more easily actuate the display division touch buttons by touch, as shown in FIG. 2*b*.

Figure 2C:
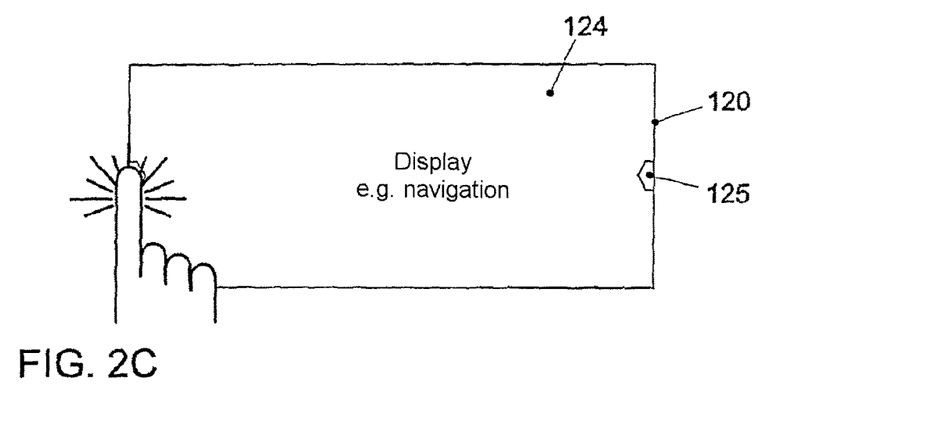

FIG. 2*c* shows how the user actuates a display division touch button 125 by touch with his finger.

Figure 2D:
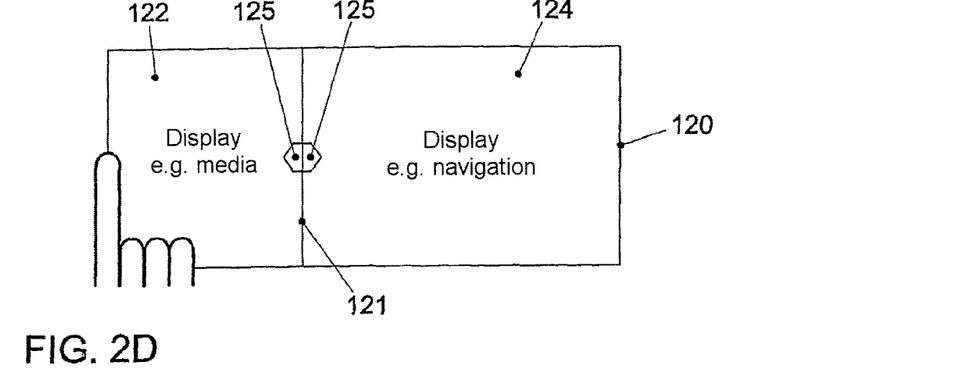

A second, different content (e.g. media) is then displayed on a sub-area 122 of the display area and the content previously played back in full-screen mode is then played back on a second sub-area 124 only, as shown in FIG. 2*d*. A boundary 121 extends between the two sub-areas from the upper edge of the display area to the lower edge of the display area. A display division touch button 125 is shown in each case on both sides of the boundary 121. The respective display division touch button 125 has an arrow-like shape which indicates to the user the direction in which the boundary 121 moves when the respective display division touch button 125 is touched.

By means of the tap (by means of the light touch) on the tab (the display division touch button), a left split screen (sub-area of the display area) therefore opens in this example to one third. In other words the boundary 121 between the sub-areas 122, 124 is movable here at discrete intervals. In the example shown, the boundary 121 moves from the left edge of the display area to one third of the width of the display area. As a result, in this example, the display area is divided into a first sub-area 122, which takes up one third of the display area, and a second sub-area 124, which takes up two thirds of the display area.

Figure 2E:
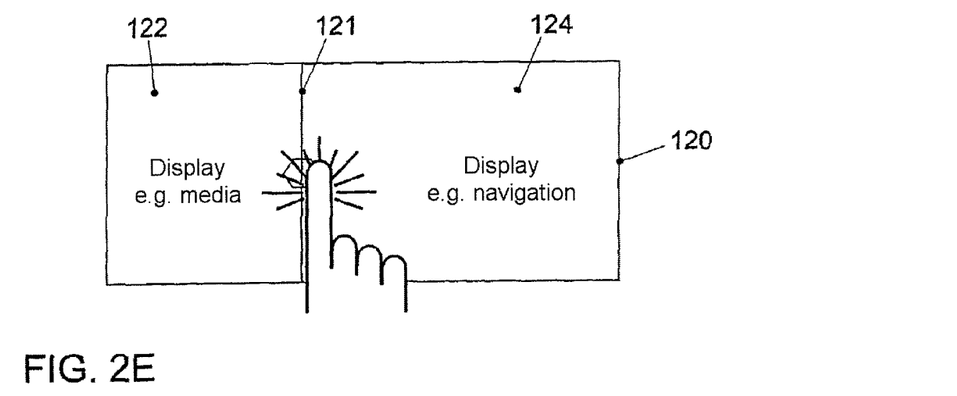
Figure 2F:
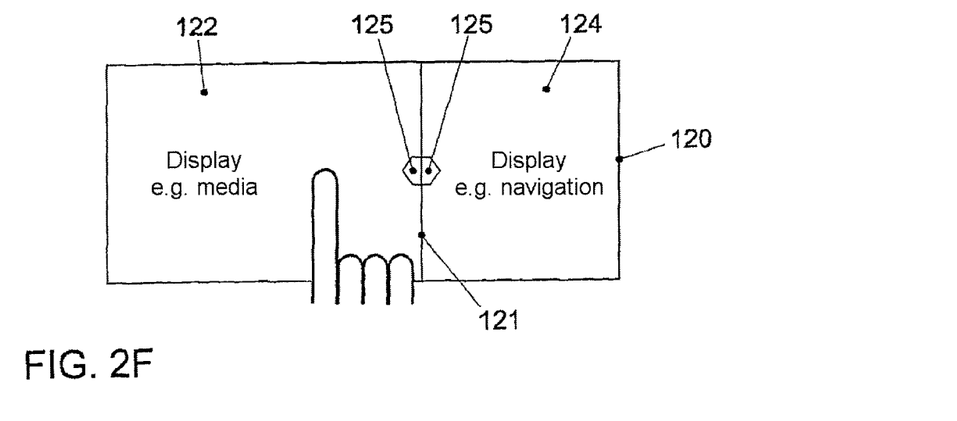

In FIG. 2*e*, the user actuates the display division touch button 125 in one of the two sub-areas, i.e., in the right sub-area 124. He therefore taps once more on a tab. As a result, the boundary 121 moves further to the right (in the direction of the second sub-area), so that the second sub-area 124 is reduced and the first sub-area 122 is enlarged. Since the boundary 122 moves at discrete intervals, the first sub-area 122 then extends over two thirds of the width of the display area and the second sub-area 124 over one third of the width of the display area. In other words, through the actuation of the display division touch button 125, the boundary 121 moves in the direction indicated by the arrow-like shape of the display division touch button 125. In the example shown, the sub-area 124 in which the actuated display division touch button 125 is disposed is reduced, as shown in FIG. 2*e*. FIG. 2*f* shows how the boundary 121 has moved further in the direction of the second sub-area 124 and the first sub-area 122 is now larger than the second sub-area 124.

Figure 2G:
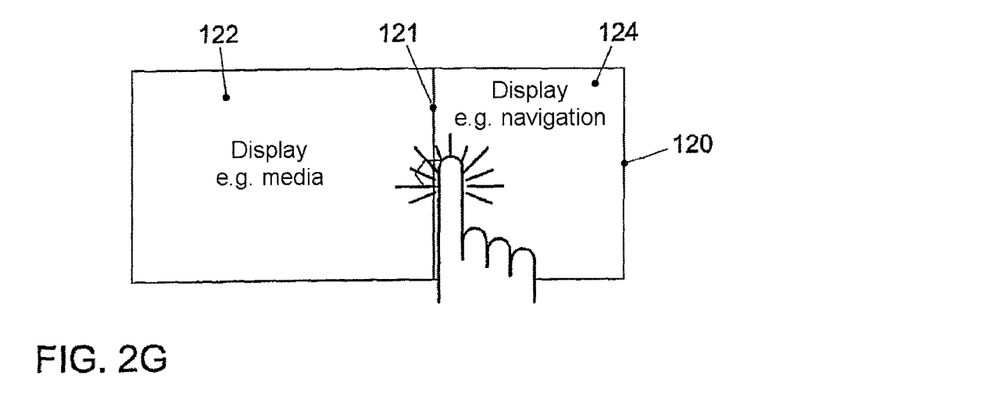
Figure 2H:
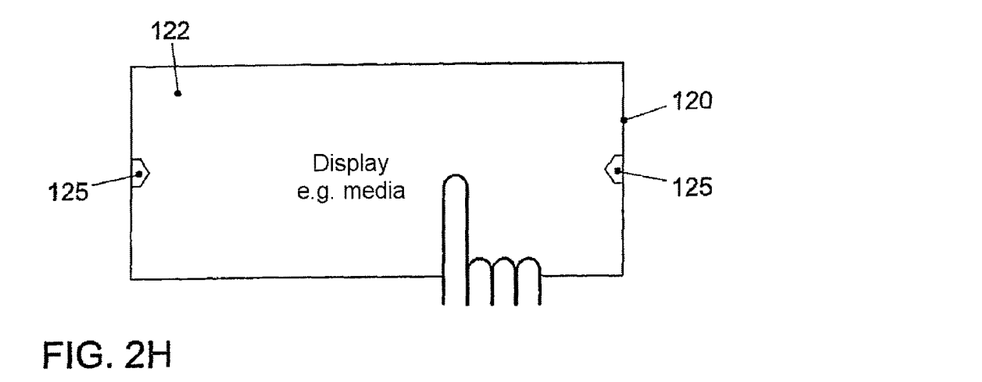
Figure 2I:
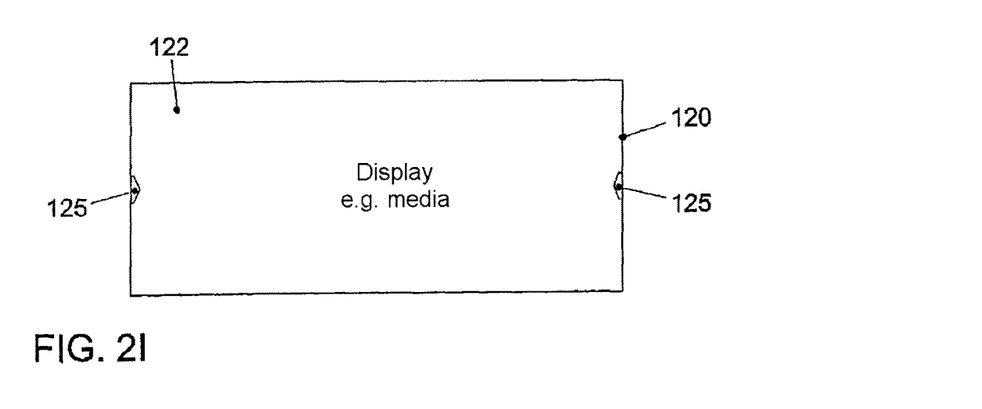

If the user again actuates the display division touch button disposed in the second, smaller sub-area 124, as shown in FIG. 2*g*, the content played back in the second sub-area 124 is completely hidden and the boundary 121 moves entirely to the right edge, as shown in FIG. 2*h*. By means of the tap on the tab, the left, two-thirds screen (the first sub-area) is enlarged to the full screen, i.e., to the entire display area. Since the user is still close to the display device 120 with his hand or finger, the display division touch buttons 125 continue to be shown in their enlarged representation. If the user moves away from the display device 120 to a distant position, the display division touch buttons 125 are then shown only in their reduced representation. The content element of the originally first sub-area to be played back is then played back in full-screen mode, as shown in FIG. 2*i*.

FIG. 3*a* to 3*h* show, in a schematic representation, a further example of the operation of an information playback system with a proximity sensor and a touch-sensitive screen as an input device.

Figure 3A:
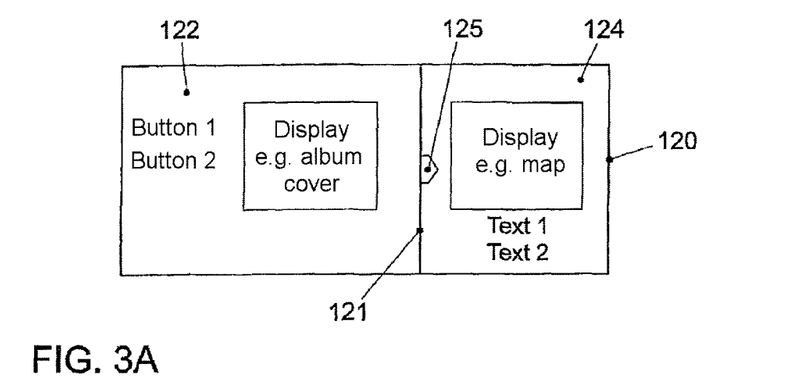
FIGS. 3a to 3h show a schematic representation of the operation of an information playback system with a proximity sensor and a touch-sensitive screen.

FIG. 3*a* shows a display area of a display device 120 with a first sub-area 122 (left sub-area) and a second sub-area 124 (right sub-area). The first sub-area takes up two thirds of the display area and the second sub-area takes up one third of the display area. Other divisions could of course also be performed or more sub-areas could be disposed. The first sub-area 122 plays back a first content element to be played back (e.g. an album cover) with two actuatable buttons (button 1 and button 2). A different content element to be played back (a map and text) is played back in the second sub-area 124. A display division touch button 125 is similarly disposed in the second sub-area 124. This may, for example, be a default setting for a condition wherein the user remains distant.

Figure 3B:
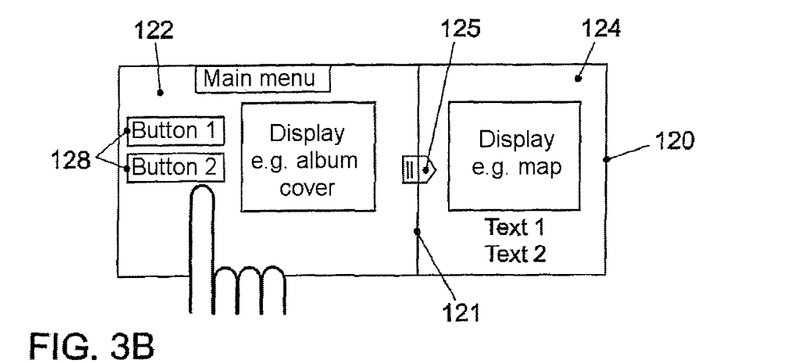
Figure 3C:
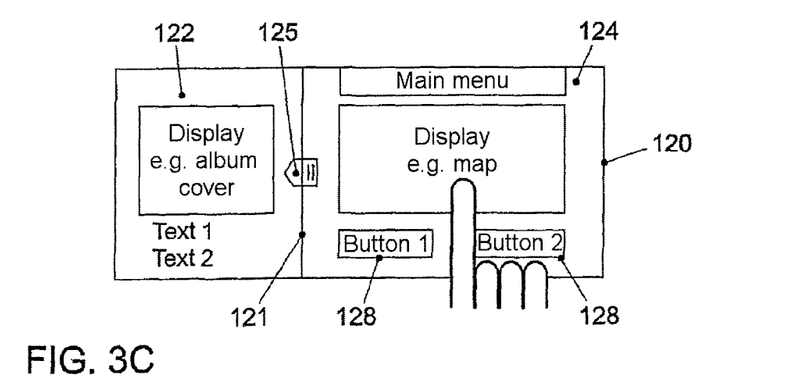

If, for example, the user approaches the first, larger sub-area 122 with his hand or his finger, as shown in FIG. 3*b*, the actuatable buttons 128 can, for example, be represented larger or can be highlighted. In addition, a hold button, for example, can be shown as an actuatable button. Optionally, a heading (e.g. main menu) can be represented larger or can be highlighted. In the example shown in FIG. 3*b*, the user therefore approaches the two-thirds sub-area (the larger sub-area).

If the user approaches the second, smaller sub-area 124 with his hand or finger, the boundary 121, for example, can be moved due to the detected approach, so that the second, smaller sub-area 121 is enlarged. In the example shown in FIG. 3*c*, the boundary 121 moves by one third of the width of the display area in the direction of the first sub-area 122, so that the second sub-area 124 is then larger than the first sub-area 122. In other words, in the event of an approach to the one-third sub-area, the latter can be enlarged to two thirds. In addition, the actuatable buttons 128 (e.g. button 1 and button 2) can also optionally be shown as enlarged or highlighted in the now enlarged second sub-area 124. Furthermore, the heading (e.g. main menu) can again optionally be shown as enlarged or highlighted. In addition, a display division touch button 125 can then optionally be shown in the first, smaller sub-area 122 to move the boundary 121 even further in the direction of the first sub-area 122 and, for example, also hide the latter completely. In addition, a hold button can also optionally be shown as an actuatable button in the larger, second sub-area 124.

Figure 3D:
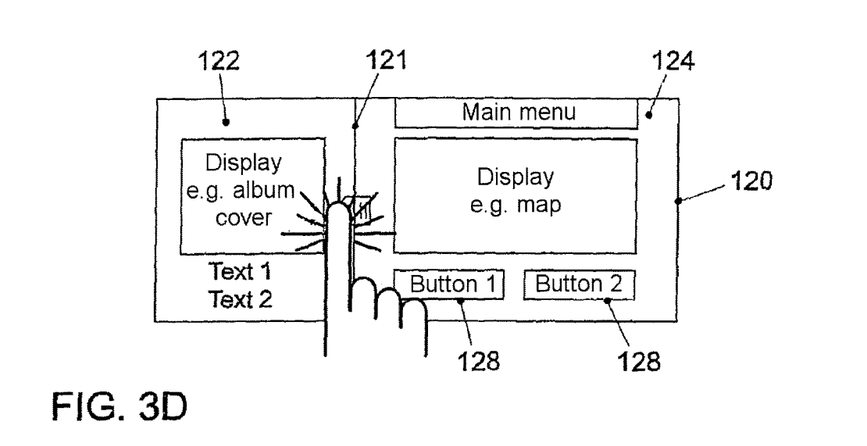

If the user then actuates the display division touch button 125, for example with his finger, in the smaller, first sub-area 122, as shown in FIG. 3*d*, the content of the first sub-area 122 to be played back can be completely hidden and the content of the second sub-area 124 to be played back can be displayed on the entire display area, i.e., as a full screen. In other words, the two-thirds sub-area can be dragged up with a click on the tab to the full screen, as shown in FIG. 3*d* and FIG. 3*e*.

Figure 3E:
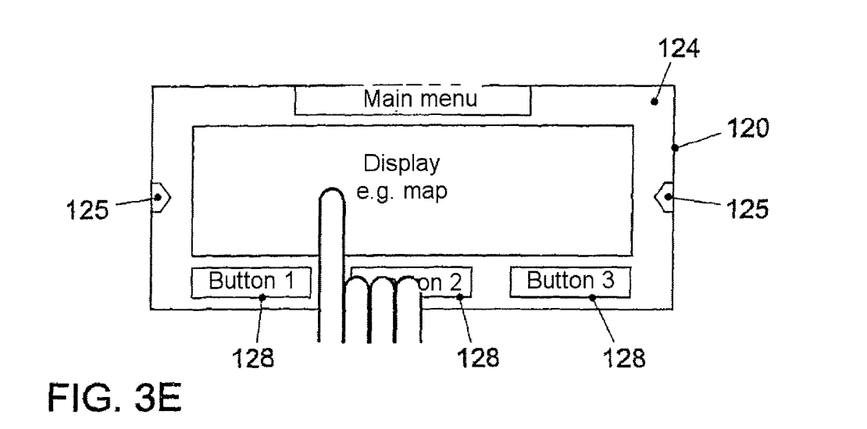

In FIG. 3*e*, the content of the second sub-area 124 to be played back is shown as a full screen. Since the user is still located in the vicinity of the display device 120 with his hand or finger, which can be detected by the proximity sensor, the actuatable buttons 128 (e.g. button 1, button 2 and button 3) can be shown as enlarged or highlighted. In addition, display division touch buttons 125 can also optionally be shown on two opposite edges of the display device 120 (e.g. left and right) in an enlarged representation. The heading can also optionally be shown as enlarged or highlighted.

Figure 3F:
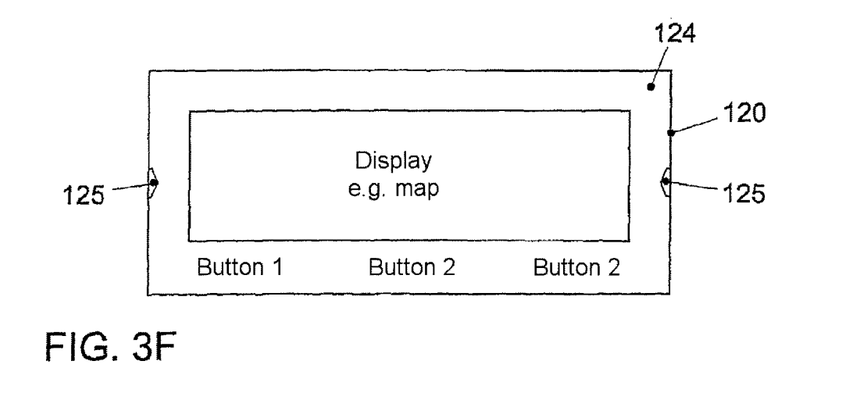
Figure 3G:
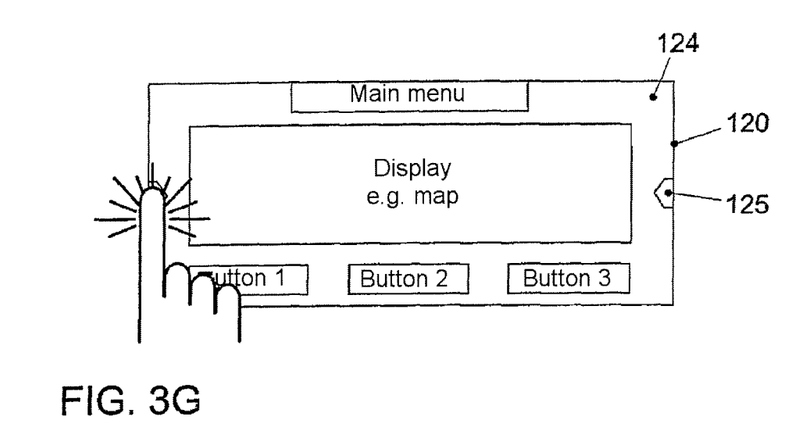
Figure 3H:
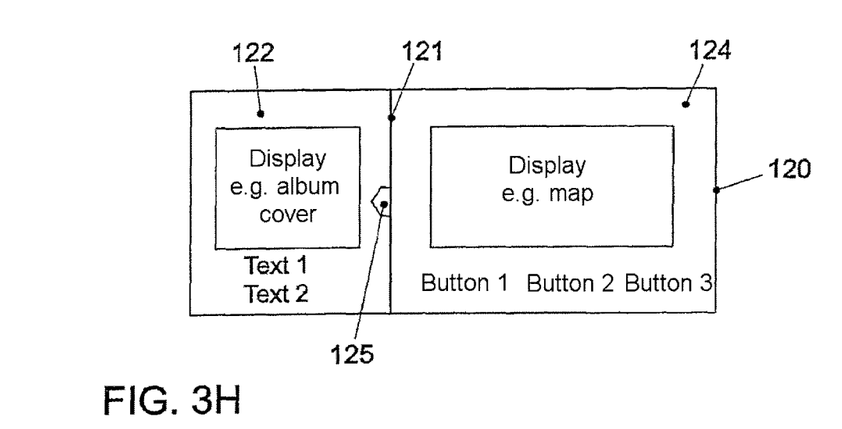

If the user moves away from the display device 120 with his hand or finger and moves to a distant position, the content to be played back can continue to be displayed in a full screen. Furthermore, the display division touch buttons 125 can be shown in a reduced representation and the actuatable buttons or headings can be shown as not enlarged or highlighted, as shown in FIG. 3*f*.

Some disclosed embodiments relate to a permanently installed infotainment system of the vehicle with an information playback system according to the principle previously described. For example, the processor may be a dedicated unit or part of the on-board computer. Furthermore, the vehicle may be a vehicle with a permanently installed information playback system.

Disclosed embodiments may relate to an extended split-screen concept (sub-area concept) in the infotainment domain. For example, parallel contexts (e.g. map, media and telephone) can be shown in an infotainment system on a touchscreen basis (display/operation). In contrast to split-screen concepts without a touchscreen, in which e.g. a laborious operation (of the touchscreen) is effected via push-and-rotary switches or through the opening of additional windows, a simple and intuitive operating concept can be implemented here.

The split-screen mode can be continuously offered via tabs and does not always have to be made available first via the settings. Furthermore, an intuitive operation of the split screen (of the screen divided into sub-areas) can be implemented via a touchscreen through incorporation of the split-screen concept via drag and drop on the touchscreen from left to right or vice versa. As a result, a free combination facility and simultaneous display and operation of e.g. two or three of the available content elements in the system can be enabled.

The split screen can be available via tabs to the left and right on the screen sides (display device sides). If a tab is dragged with the finger to the middle of the screen, the screen can be divided e.g. into ⅔ and ⅓ and an operation is possible. With identical content elements, the screen can switch to full-screen mode. If, for example, media and radio are on, the medium can be played which is located on the ⅔ screen (on the larger sub-area). If the user wishes to have the full-screen mode, a tab can be dragged back and the required menu appears on the full screen. The concept can, for example, also be transferred to a representation of three parallel contexts (in three sub-areas). The content elements in the context windows can also be changed by swiping up and down on the touchscreen or in the space (gesture control).

A split-screen option can be continuously available and simple to operate. If it is not required, the full screen can also be retained. A fast and intuitive operation of the split-screen concept can be enabled via a touchscreen.

The screen content can be divided e.g. by means of a tab/button on the seam (boundary) between the screens (sub-areas) and the screen sizes can thus be controlled. The full screen can be reduced to ⅔, for example, by means of a tab/button on the side. A division of left ⅔ and right ⅓ as the default setting is, for example, possible.

By means of a proximity sensor, e.g. in the event of an approach to ⅓, the screen can be dragged up to ⅔. Furthermore, in the event of an approach to ⅔, for example, panels/buttons (operable panels/buttons) can be shown as larger/highlighted. Additionally or alternatively, e.g. in the event of an approach to ⅔, a hold button can appear which keeps the enlarged part at ⅔ or, in the event of an approach to ⅓, this screen can be enlarged to ⅔ and can then be kept at ⅔ with Hold.

A main menu for selecting the screen content can appear in the event of an approach for the selection of the screen content elements.

Figure 4:
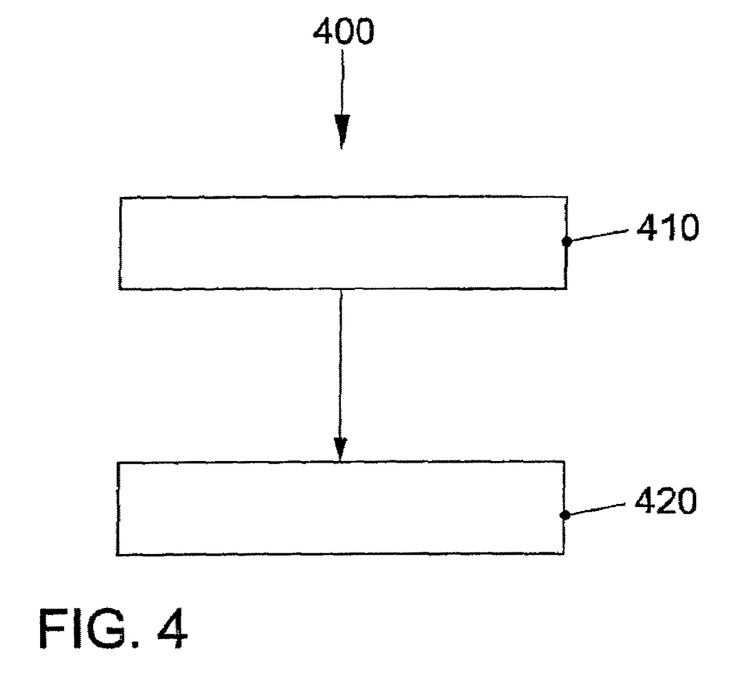
FIG. 4 shows a flow diagram of a method for information playback.

FIG. 4 shows a flow diagram of a method 400 for information playback according to at least one disclosed embodiment. The method 400 comprises a generation 410 and provision of a video or control signal, so that a playback of at least two different content elements in two adjacent sub-areas of a display area of the display device is initiated by the video or control signal. Furthermore, the method 400 comprises a moving 420 of a boundary between the two sub-areas based on a selection, detected by the display device and caused by a touch of a user, of a display division touch button in one of the two sub-areas, based on an approach of a user, detected by an input device, to one of the two sub-areas, or based on a predefined movement of the user, detected by an input device, in a direction orthogonal to the boundary between the two sub-areas, so that a ratio of the area portions of the two sub-areas on the display area of the display device changes.

The method 400 may comprise further optional, additional or alternative method steps which correspond to optional, additional or alternative designs which have been explained in connection with the embodiments previously described.

The features disclosed in the above description, the following claims and the attached figures may be of importance and may be implemented both individually and in any given combination for the realization of a disclosed embodiment in its different designs.

Although some aspects have been described in connection with a device, it is obvious that these aspects also represent a description of the corresponding method, so that a block or a component of a device is also to be understood as a corresponding method step or as a feature of a method step. By the same token, aspects that have been described in connection with or as a method step also represent a description of a corresponding block or detail or feature of a corresponding device.

Depending on specific implementation requirements, disclosed embodiments can be implemented in hardware or in software. The implementation can be carried out using a digital storage medium, for example a floppy disk, a DVD, a Blu-ray disc, a CD, a ROM, a PROM, an EPROM, an EEPROM or a FLASH memory, a hard disk or a different magnetic or optical storage device on which electronically readable control signals are stored which can interact or interact with a programmable hardware component in such a way that the respective method is carried out.

A programmable hardware component may be formed by a processor, a computer processor (CPU=Central Processing Unit), a graphics processor (GPU=Graphics Processing Unit), a computer, a computer system, an Application-Specific Integrated Circuit (ASIC), an Integrated Circuit (IC), a System On Chip (SOC), a programmable logic element or a Field Programmable Gate Array (FPGA) with a microprocessor.

The digital storage medium may therefore be machine-readable or computer-readable. Some disclosed embodiments therefore comprise a data medium which has electronically readable control signals which are capable of interworking with a programmable computer system or programmable hardware component in such a way that one of the methods described herein is carried out. At least one disclosed embodiment is a data medium (or a digital storage medium or computer-readable medium) on which the program to carry out one of the methods described herein is recorded.

Disclosed embodiments can generally be implemented as a program, firmware, a computer program or a computer program product with a program code or as data, wherein the program code or the data is/are effective in carrying out one of the methods when the program runs on a processor or on a programmable hardware component. The program code or the data may, for example, also be stored on a machine-readable medium or data medium. The program code or the data may, inter alia, be present as source code, machine code or byte code, or as a different intermediate code.

A further disclosed embodiment is, moreover, a data stream, a signal sequence or a sequence of signals representing the program for carrying out one of the methods described herein. The data stream, the signal sequence or the sequence of signals may, for example, be configured to be transferred via a data communication connection, for example via the Internet or via a different network. Disclosed embodiments are, therefore, also signal sequences representing data which are suitable for a transmission via a network or a data communication connection, wherein the data represent the program.

A program according to at least one disclosed embodiment may implement one of the methods during its performance, for example in that the program reads out storage locations or writes a datum or a plurality of data to the storage locations, as a result of which use is made, if necessary, of switching processes or other processes in transistor structures, in amplifier structures or in other electrical, optical, magnetic components or components operating according to a different functional principle. Correspondingly, data, values, sensor values and other information can be acquired, defined or measured by a program through a readout of a storage location. A program can therefore acquire, define and measure parameters, values, measurement parameters and other information through a readout of one or more storage locations, and can effect, initiate or carry out an action by writing to one or more storage locations, and can control other devices, machines and components.

The disclosed embodiments described above merely represent an illustration of the principles of the present invention. It is obvious that modifications and variations of the arrangements and details described herein will be evident to other persons skilled in the art. It is. Therefore. the invention is limited only by the protective scope of the patent claims set out below and not by the specific details that have been presented herein with reference to the description and the explanation of the disclosed embodiments.

The invention claimed is:

1. An information playback system in a vehicle having a processor which generates a video or control signal and delivers the signal to a display device so that a playback of at least two different content elements in two adjacent sub-areas of a display area of the display device is initiated by the video or control signal,
wherein the processor of the information playback system in the vehicle generates the video or control signal so that a boundary between the two sub-areas is movable so as to effect division of the two sub-areas:
based on a selection of a display division touch button detected by the display device and caused by a touch of a user in one of the two sub-areas, or
based on an approach of user, detected by an input device, to one of the two sub-areas,
so that a ratio of area proportions of the two sub-areas on the display area of the display device changes,
wherein the at least two different content elements comprise at least two of entertainment information, vehicle condition information, communication information, or navigation data, and
wherein the display division touch button switches to an enlarged representation of the display division touch button in response to the approach of user detected by the input device.

2. The information playback system of claim 1, wherein the display device is a touch-sensitive screen and the boundary between the two sub-areas is moved on the basis of an actuation, detected by the touch-sensitive screen and caused by a touch of a user, of the display division touch button which is disposed in one of the two sub-areas.

3. The information playback system of claim 2, wherein the processor generates the video or control signal so that the display division touch button has an arrow-like shape or an arrow-like graphic which indicates a direction in which the boundary moves when the display division touch button is touched.

4. The information playback system of claim 1, wherein an input device is a spatial-resolution proximity sensor which detects an approach of a user and identify which of the two sub-areas the user is approaching.

5. The information playback system of claim 4, wherein the processor, in the event of a detected approach to a first, smaller sub-area of the two sub-areas, generates the video or control signal so that the first sub-area is as large as or larger than the second of the two sub-areas after the boundary has been moved.

6. The information playback system of claim 4, wherein the display device is a touch-sensitive screen and the processor, in the event of a detected approach to a first, larger sub-area of the two sub-areas, generates the video or control signal such that, following a detected approach, at least one actuatable touch button disposed in the first sub-area is shown as larger or is highlighted.

7. The information playback system of claim 4, wherein the display device is a touch-sensitive screen and the processor, in the event of a detected approach to a first, larger sub-area of the two sub-areas, generates the video or control signal such that, following a detected approach in the first sub-area, a hold button appears as an actuatable touch button, wherein, through actuation of the hold button by the user, the ratio of the area portions of the sub-areas is initially kept constant.

8. The information playback system of claim 4, wherein, in the event of a detected approach to one of the two sub-areas, the processor generates the video or control signal such that, following a detected approach in the one sub-area, a menu appears for selection of a content element to be played back in the one sub-area.

9. The information playback system of claim 1, wherein an input device is a touch-sensitive screen which detects a predefined movement on its surface, or an input device is a camera system which detects the predefined movement through an evaluation of a gesture of the user, wherein the processor generates the video or control signal so that the boundary is moved in a direction of the movement.

10. The information playback system of claim 9, wherein the input device detects a predefined movement of the user in a direction parallel to the boundary between the two sub-areas, wherein the processor generates the video or control signal, following detection of a movement running parallel to the boundary such that a content element selected on the basis of the detected movement and differing from the content played back before the detection of the movement is played back in one of the two sub-areas.

11. The information playback system of claim 1, wherein the processor generates the video or control signal so that the boundary is moved only at predefined places only.

12. The information playback system of claim 1, wherein the boundary between the two sub-areas runs essentially vertically between the two sub-areas from an upper edge of the display area of the display device to a lower edge of the display area of the display device.

13. The information playback system of claim 1, wherein the processor generates the video or control signal so that the boundary between the two sub-areas is movable based on a predefined movement of the user, detected by the input device, in a direction orthogonal to the boundary between the two sub areas.

14. A permanently installed infotainment system of a vehicle with an information playback system having a processor which generates a video or control signal and deliver the signal to a display device so that a playback of at least two different content elements in two adjacent sub-areas of a display area of the display device is initiated by the video or control signal,
wherein the processor of the infotainment system of the vehicle generates the video or control signal so that a boundary between the two sub-areas is movable so as to effect division of the two sub-areas:
based on a selection of a display division touch button detected by the display device and caused by a touch of a user in one of the two sub-areas, or
based on an approach of user, detected by an input device, to one of the two sub-areas,
so that a ratio of the area proportions of the two sub-areas on the display area of the display device changes,
wherein the at least two different content elements comprise at least two of entertainment information, vehicle condition information, communication information, or navigation data, and
wherein the display division touch button switches to an enlarged representation of the display division touch button in response to the approach of user detected by the input device.

15. The permanently installed infotainment system of claim 14, wherein the processor generates the video or control signal so that the boundary between the two sub-areas is movable based on a predefined movement of the user, detected by the input device, in a direction orthogonal to the boundary between the two sub areas.

16. A method for information playback, the method comprising:
generating and providing a video or control signal, so that a playback of at least two different content elements in two adjacent sub-areas of a display area of the display device located in a vehicle is initiated by the video or control signal, and
moving a boundary between the two sub-areas based on a selection of a display division touch button in one of the two sub-areas detected by the display device so as to effect a division of the two sub-areas and caused by a touch of a user:
based on an approach of a user, detected by an input device, to one of the two sub-areas,
so that a ratio of area portions of the two sub-areas on the display area of the display device changes,
wherein the at least two different content elements comprise at least two of entertainment information, vehicle condition information, communication information, or navigation data, and
wherein the display division touch button switches to an enlarged representation of the display division touch button in response to the approach of user detected by the input device.

17. A program with a program code to carry out one of the methods as claimed in claim 16, wherein the program code is run on a computer, a processor or a programmable hardware component.

18. The method of claim 16, further comprising moving a boundary between the two sub-areas based on a selection of a display division touch button in one of the two sub-areas detected by the display device and caused by a touch of a user based on a predefined movement of the user, detected by the input device, in a direction orthogonal to the boundary between the two sub areas.

* * * * *